US012430247B2

(12) United States Patent
Venkataramudu et al.

(10) Patent No.: US 12,430,247 B2
(45) Date of Patent: Sep. 30, 2025

(54) BMC MEMORY EXPANSION SYSTEM

(71) Applicant: Dell Products L.P., Round Rock, TX (US)

(72) Inventors: Raghavendra Venkataramudu, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/519,431

(22) Filed: Nov. 27, 2023

(65) Prior Publication Data

US 2025/0173263 A1    May 29, 2025

(51) Int. Cl.
*G06F 12/06* (2006.01)
*G06F 13/16* (2006.01)
*G06F 13/42* (2006.01)

(52) U.S. Cl.
CPC ........ *G06F 12/063* (2013.01); *G06F 13/1663* (2013.01); *G06F 13/4221* (2013.01)

(58) Field of Classification Search
CPC .............. G06F 12/063; G06F 12/0623; G06F 12/0615; G06F 13/1663; G06F 13/4221
See application file for complete search history.

(56) References Cited

U.S. PATENT DOCUMENTS

| | | | | |
|---|---|---|---|---|
| 2018/0157494 A1* | 6/2018 | Dunham | ................ | G06F 13/24 |
| 2020/0371695 A1* | 11/2020 | Gopal | ................... | G06F 3/0658 |
| 2022/0060339 A1* | 2/2022 | Ballard | ................. | H04L 9/0643 |
| 2022/0066827 A1* | 3/2022 | Tavallaei | .............. | G06F 9/5077 |
| 2022/0171726 A1* | 6/2022 | Lambert | ............. | G06F 13/4282 |
| 2022/0318043 A1* | 10/2022 | Liu | ..................... | G06F 9/45558 |
| 2024/0330228 A1* | 10/2024 | Cudak | ................. | G06F 13/1668 |
| 2024/0419585 A1* | 12/2024 | Kachare | .................. | G06F 3/067 |

OTHER PUBLICATIONS

Jessie Frazelle, "Opening up the Baseboard Management Controller," Commit to memory, acmqueue, Sep.-Oct. 2019, 8 pages, https://blog.jessfraz.com/pdf/opening-up-the-baseboard-management-controller.pdf.

\* cited by examiner

*Primary Examiner* — Tracy A Warren
(74) *Attorney, Agent, or Firm* — Joseph Mencher

(57) ABSTRACT

A BMC memory expansion system includes a computing device having a BMC device that provides services for the computing device, a memory subsystem, a computing device component coupled to the memory subsystem, and a memory agent subsystem coupled to the BMC device and the computing device component. The memory agent subsystem receives a service memory request from the BMC device and, in response, instructs the computing device component to operate as a memory proxy and reserve the memory subsystem for use by the BMC device to provide a BMC reserved memory subsystem. The memory agent subsystem then transmits data from the BMC device and via the computing device component to the BMC reserved memory subsystem, and from the BMC reserved memory subsystem and via the computing device component to the BMC device, to allow the BMC device to provide at least one of the services for the computing device.

20 Claims, 10 Drawing Sheets

BMC MEMORY EXPANSION SYSTEM

BACKGROUND

The present disclosure relates generally to information handling systems, and more particularly to expanding memory available to a Baseboard Management Controller (BMC) device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include Baseboard Management Controller (BMC) devices such as the integrated DELL® Remote Access Controller (iDRAC) provided in server devices available from DELL® Inc. of Round Rock, Texas, United States. As will be recognized by one of skill in the art in possession of the present disclosure, such BMC devices may operate as an Out-Of-Band (OOB) management platform that utilizes hardware resources that are mostly separate from the computing device in which they are located in order to provide a browser-based interface or Command-Line Interface (CLI) for managing and monitoring components in the computing device, as well as perform other BMC functionality known in the art. However, conventional BMC devices are provided with fixed hardware resources that can limit those BMC devices to operate with (or perform desired functionality for) a limited number of generations of computing devices. Furthermore, Software Development Kits (SDKs) are now available to provide different applications on BMC devices in order to expand the functionality of the BMC device without the need for BMC firmware updates, and such applications will be constrained by the limited hardware resources available in conventional BMC devices as well.

Accordingly, it would be desirable to provide a BMC system that addresses the issues discussed above.

SUMMARY

According to one embodiment, an Information Handling System (IHS) includes a memory agent processing system; and a memory agent memory system that is coupled to the memory agent processing system and that includes instructions that, when executed by the memory agent processing system, cause the memory agent processing system to provide a memory agent engine that is configured to: receive, from a Baseboard Management Controller (BMC) device that is coupled to the memory agent processing system, a service memory request; instruct, based on the service memory request, a computing device component that is coupled to the memory agent processing system to operate as a memory proxy and reserve a memory subsystem for use by the BMC device to provide a BMC reserved memory subsystem; and transmit, via the computing device component, data from the BMC device to the BMC reserved memory subsystem and from the BMC reserved memory subsystem to the BMC device to allow the BMC device to provide at least one service for the IHS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
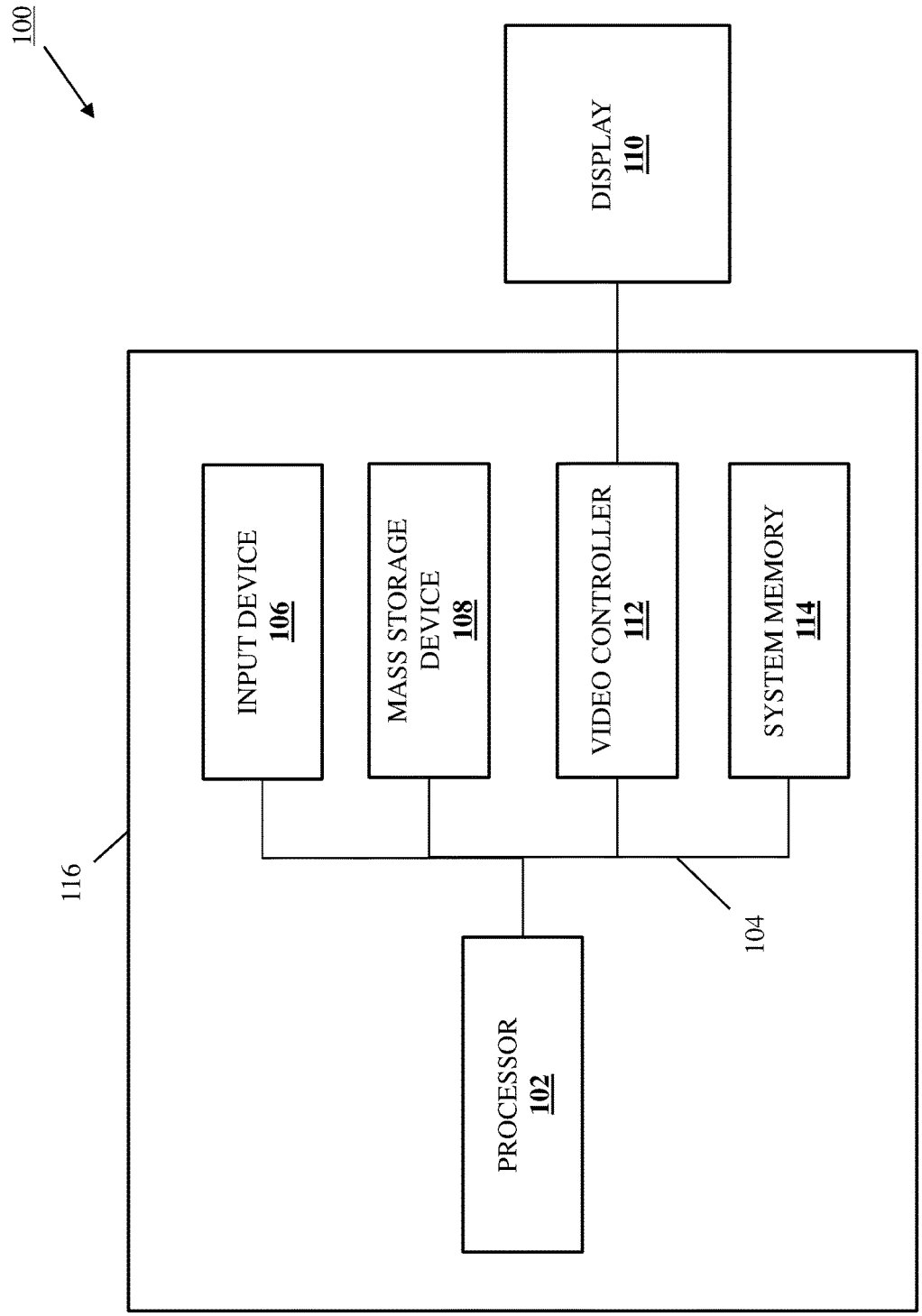
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
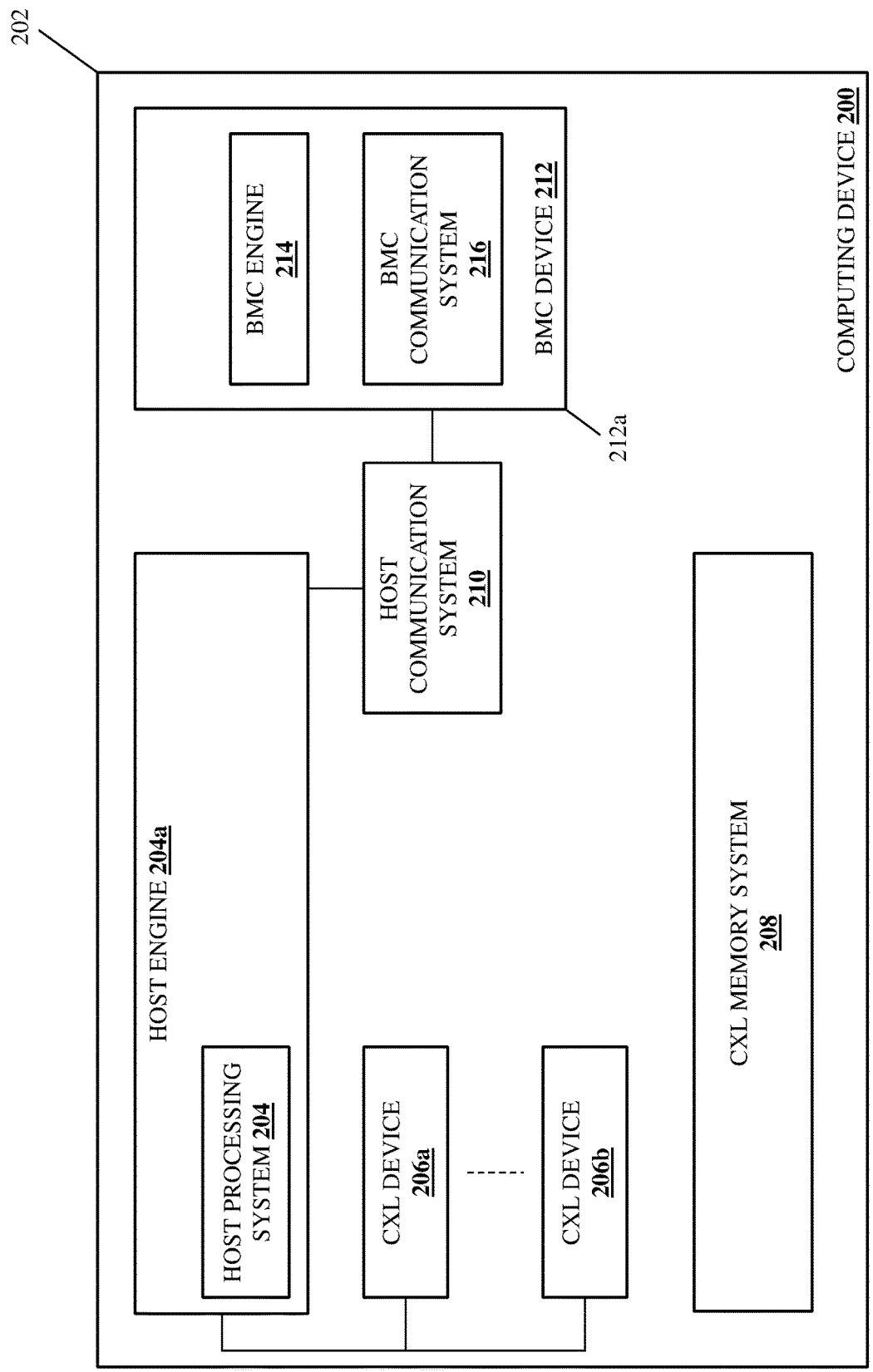
FIG. 2 is a schematic view illustrating an embodiment of a computing device that may provide the BMC memory expansion system of the present disclosure.

Referring now to FIG. 2, an embodiment of a computing device 200 is illustrated that may provide the BMC memory expansion system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a host processing system 204. In some examples, the host processing system 204 may be provided by the processor 102 discussed above with reference to FIG. 1 (e.g., a Central Processing Unit (CPU)), and the chassis 202 may house a host memory system (not illustrated, but which may include the memory 114 discussed above with reference to FIG. 1 such as, for example, Dynamic Random Access Memory (DRAM)) that is coupled to the host processing system 204 and that includes instructions that, when executed by the host processing system 204, cause the host processing system 204 to provide a host engine 204a that is configured to provide an operating system and/or otherwise perform the functionality of the host engines and/or host subsystems discussed below.

In other examples, the host processing system 204 may be provided by any of a variety of Basic Input/Output System (BIOS) firmware processing systems that would be apparent to one of skill in the art in possession of the present disclosure, and the chassis 202 may house a host memory system (not illustrated, but which may be provided by any of a variety of BIOS firmware memory systems that would be apparent to one of skill in the art in possession of the present disclosure) that is coupled to the host processing system 204 and that includes instructions that, when executed by the host processing system 204, cause the host processing system 204 to provide the host engine 204a that is configured to provide a BIOS, Unified Extensible Firmware Interface (UEFI), and/or otherwise perform the functionality of the host engines and/or host subsystems discussed below. However, while two specific host engines have been described, one of skill in the art in possession of the present disclosure will appreciate how other host engines will fall within the scope of the present disclosure as well.

The chassis 202 may also house a plurality of computing device components that are each coupled to the host engine 204a (e.g., via a coupling between that computing device component and the host processing system 204) and that, in the embodiments illustrated and described below, are provided by Compute eXpress Link (CXL) devices 206a and up to 206b. The chassis 202 may also house a memory system 208 that, in the embodiments illustrated and described below, is provided by a CXL memory system 208 that, while not explicitly illustrated in FIG. 2, is coupled to each of the CXL devices 206a-206b. As will be appreciated by one of skill in the art in possession of the present disclosure, the CXL memory system 208 may include any of a variety of CXL memory devices that are configured according to the CXL standard to provide a common memory space for the computing device 200, and each of the CXL devices 206a-206b may be configured according to the CXL standard to utilize the CXL memory system 208. However, while illustrated and described as including a CXL memory system used by CXL devices, one of skill in the art in possession of the present disclosure will recognize how other types of memory systems used by other types of computing device components may be configured to provide the functionality described below while remaining within the scope of the present disclosure as well.

The chassis 202 may house a host communication system 210 that is coupled to the host engine 204a (e.g., via a coupling to the host processing system 204) and that may include a variety of host communication components such as, for example, host communication components that one of skill in the art in possession of the present disclosure will recognize may be used to provide the Memory Mapped BMC Interface (MMBI) described below.

The chassis 202 may also house a BMC device 212 that one of skill in the art in possession of the present disclosure will recognize may operate as an Out-Of-Band (OOB) management platform that utilizes hardware resources that are mostly separate from the computing device 200 in order to provide a browser-based interface or Command-Line Interface (CLI) for managing and monitoring components in the computing device 200, as well as perform other BMC functionality known in the art. In a specific example, the BMC device 212 may be provided by the integrated DELL® Remote Access Controller (iDRAC) provided in server devices available from DELL® Inc. of Round Rock, Texas, United States, although other BMC device that would be apparent to one of skill in the art in possession of the present disclosure will fall within the scope of the present disclosure as well.

In the illustrated embodiment, the BMC device 212 includes a chassis 212a (e.g., a circuit board) that supports the components of the BMC device 212, only some of which are illustrated and described below. For example, the chassis 212a may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 214 that is configured to provide the services and/or otherwise perform the functionality of the BMC engines, BMC subsystems, and/or BMC devices discussed below. The chassis 212a may also support a BMC communication system 216 that is coupled to the BMC engine 214 (e.g., via a coupling to the BMC processing system) and that may include a variety of BMC communication components such as, for example, BMC communication components that one of skill in the art in possession of the present disclosure will recognize may be used to provide the MMBI described below.

However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BMC memory expansion functionality discussed below, while remaining within the scope of the present disclosure as well.

Figure 3:
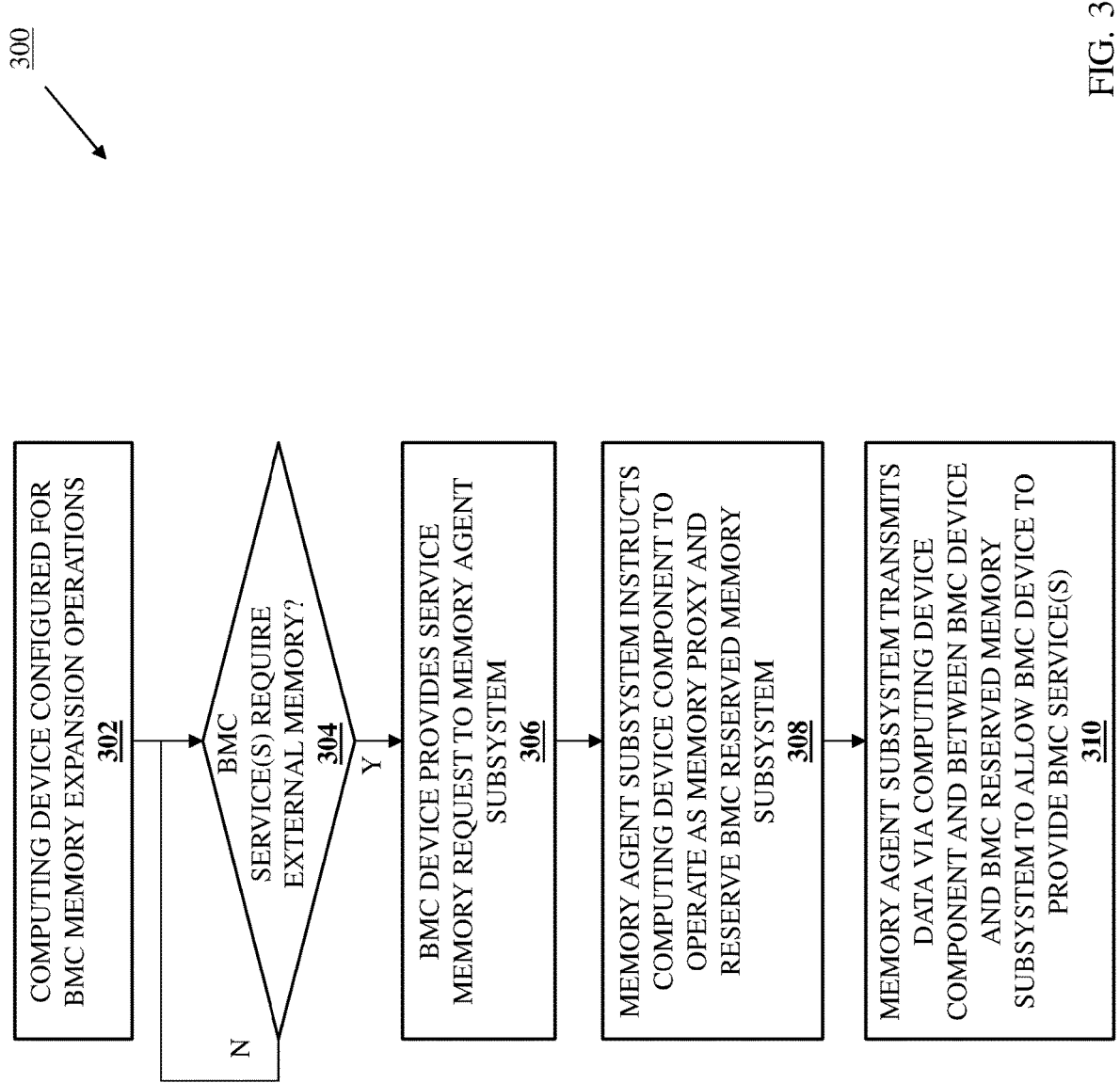
FIG. 3 is a flow chart illustrating an embodiment of a method for expanding memory available to a BMC device.

Referring now to FIG. 3, an embodiment of a method 300 for expanding memory available to a Baseboard Management Controller (BMC) device is illustrated. As discussed below, the systems and methods of the present disclosure provide for the use of an external memory system in a computing device by its BMC device. For example, the BMC memory expansion system of the present disclosure may include a computing device having a BMC device that provides services for the computing device, a memory subsystem, a computing device component coupled to the memory subsystem, and a memory agent subsystem coupled to the BMC device and the computing device component. The memory agent subsystem receives a service memory request from the BMC device and, in response, instructs the computing device component to operate as a memory proxy and reserve the memory subsystem for use by the BMC device to provide a BMC reserved memory subsystem. The memory agent subsystem then transmits data from the BMC device and via the computing device component to the BMC reserved memory subsystem, and from the BMC reserved memory subsystem and via the computing device component to the BMC device, to allow the BMC device to provide at least one of the services for the computing device. As such, BMC devices may dynamically expand their memory resources as needed in order to provide services(s) for their computing device.

Figure 4:
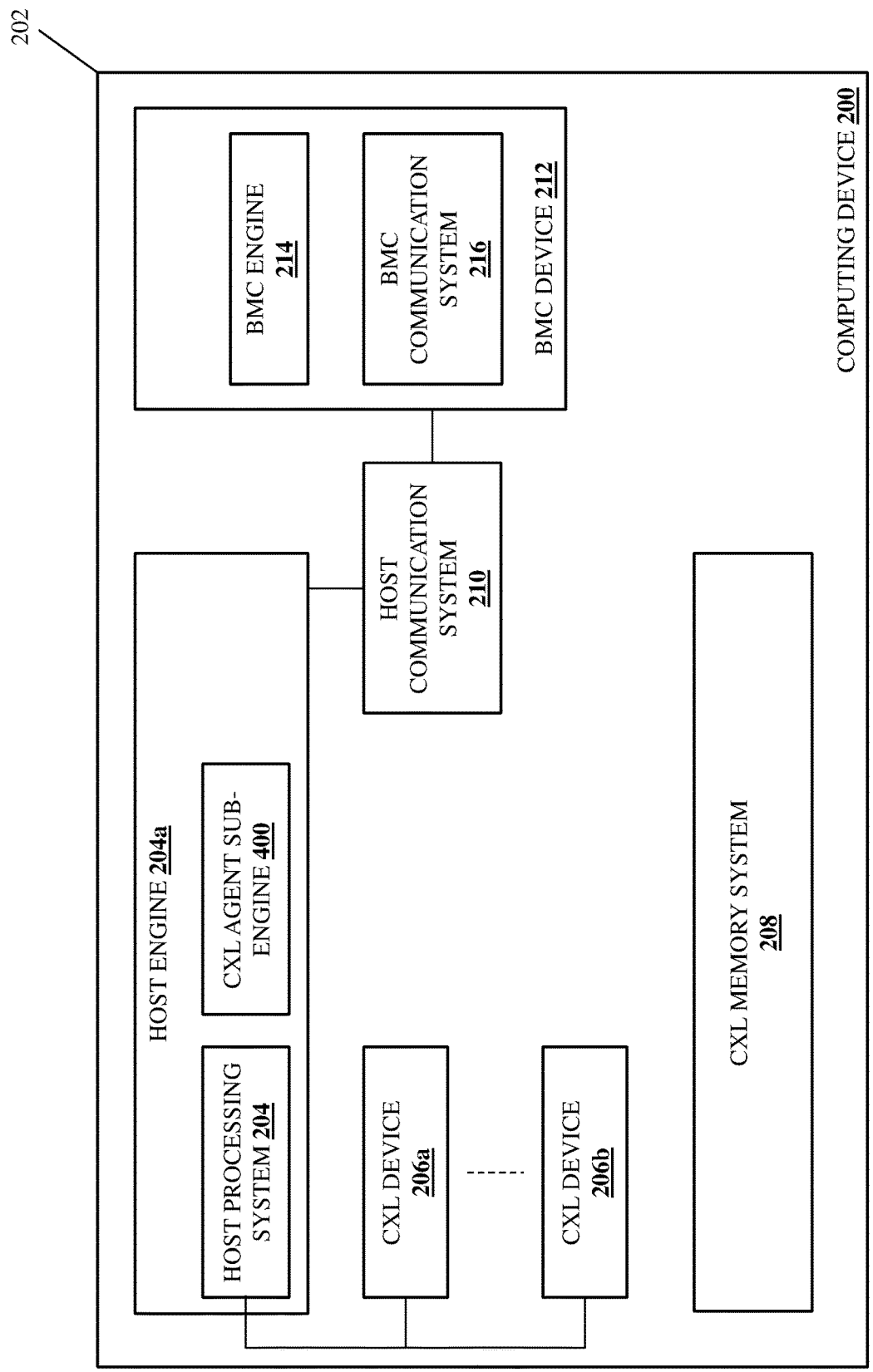
FIG. 4 is a schematic view illustrating an embodiment of the computing device of FIG. 2 operating during the method of FIG. 3.

The method 300 begins at block 302 where a computing device is configured for BMC memory expansion operations. With reference to FIG. 4, in an embodiment of block 302, the computing device 200 be powered on, reset, rebooted, and/or otherwise initialized and, in response, a memory agent subsystem such as the CXL agent sub-engine 400 illustrated in FIG. 4 may be provided. As will be appreciated by one of skill in the art in possession of the present disclosure, the host memory system described above (e.g., that provides the host engine 204a) may include a memory agent memory system that includes instructions that, when executed by a memory agent processing system included in the host processing system 204, cause the memory agent processing system to provide the CXL agent sub-engine 400 that is configured to perform the functionality of the CXL agent sub-engines, CXL agent subsystems, and/or memory agent subsystems detailed below.

To provide some specific examples, the CXL agent sub-engine 400 may be provided by a CXL agent in an operating system provided by the host engine 204a during runtime of the computing device 200 (e.g., the functionality of the CXL agent sub-engine 400 may be enabled by a BIOS runtime service provided by the BIOS via execution of a BIOS CXL driver), by a UEFI boot service in a BIOS provided by the host engine 204a during initialization of the computing device 200 (e.g., the functionality of the CXL agent sub-engine 400 may be enabled by a pre-boot service provided by the BIOS via execution of a BIOS CXL driver), and/or by other memory agent subsystems that one of skill in the art in possession of the present disclosure would recognize as being capable of providing the memory agent functionality described below.

In an embodiment, as part of the initialization of the computing device 200, a Memory-Mapped BMC Interface (MMBI) may be initialized and provided for use during runtime of the computing device 200 using the host communication system 210 and the BMC communication system 216. To provide a specific example, the MMBI may be provided using an enhanced Serial Peripheral Interface (eSPI) subsystem, a Peripheral Component Interface express 2.0 (PCIe 2.0) subsystem, and/or other communication components that one of skill in the art in possession of the present disclosure would recognize as providing the MMBI functionality described below. Furthermore, in some embodiments the BMC engine 214 may initialize a BMC Memory Management Service (BMMS), and one of skill in the art in possession of the present disclosure will appreciate how that BMMS initialization may be independent of the initialization of the computing device 200 (i.e., due to the independent operation of the BMC device 212 relative to the computing device 200), and thus may occur as part of, or prior to, the method 300. However, while specific configuration operations for the computing device 200 that enable the BMC memory expansion functionality of the present disclosure have been described, one of skill in the art in possession of the present disclosure will appreciate how the computing device 200 may be configured in a variety of manners while enabling the BMC memory expansion functionality described below while remaining within the scope of the present disclosure as well.

The method 300 then proceeds to decision block 304 where the method 300 proceeds depending on whether one or more BMC services require external memory. As will be appreciated by one of skill in the art in possession of the present disclosure, the BMC engine 214 in the BMC device 212 may be configured to provide one or more services (e.g., host management services and/or other BMC/host services known in the art), and any of those services may be started, "launched", and or otherwise provided at some point during initialization or runtime of the computing device 200. Furthermore, any of the service(s) may be provided by the BMC engine 214 via code stored in the BMC firmware, code provided as part of an application (e.g., the applications provided via the SDKs discussed above), and/or in other manner that would be apparent to one of skill in the art in possession of the present disclosure. As such, in an embodiment of decision block 304, the method 300 may proceed depending on whether the BMC engine 214 in the BMC device 212 determines that a service will be (or has begun being) provided and, if so, whether that service requires external memory. For example, at decision block 304, the BMMS provided by the BMC engine 214 may determine whether a service is being launched and, if, may determine whether that service will be provided using the BMC memory system in the BMC device 212 (e.g., the BMC memory system that is also used to provide the BMC engine 214 as described below), or whether that service will require memory external to the BMC device 212 in order to be provided.

If, at decision block 304, it is determined that no BMC services require external memory, the method 300 returns to decision block 304. For example, as will be appreciated by one of skill in the art in possession of the present disclosure, service(s) provided by the BMC engine 214 in the BMC device may be provided using the BMC memory system in the BMC device 212 (e.g., "core" service(s), service(s) that are not dependent on the host, etc.), and if those services are launched at decision block 304, the BMC engine 214 may allocate memory from the BMC memory system in the BMC device 212 for use in providing those services. As such, the method 300 may loop such that the BMC engine 214 identifies services that will be (or have begun being) provided, and determines whether any service will require external memory until such a service with external memory requirements is identified.

Figure 5:
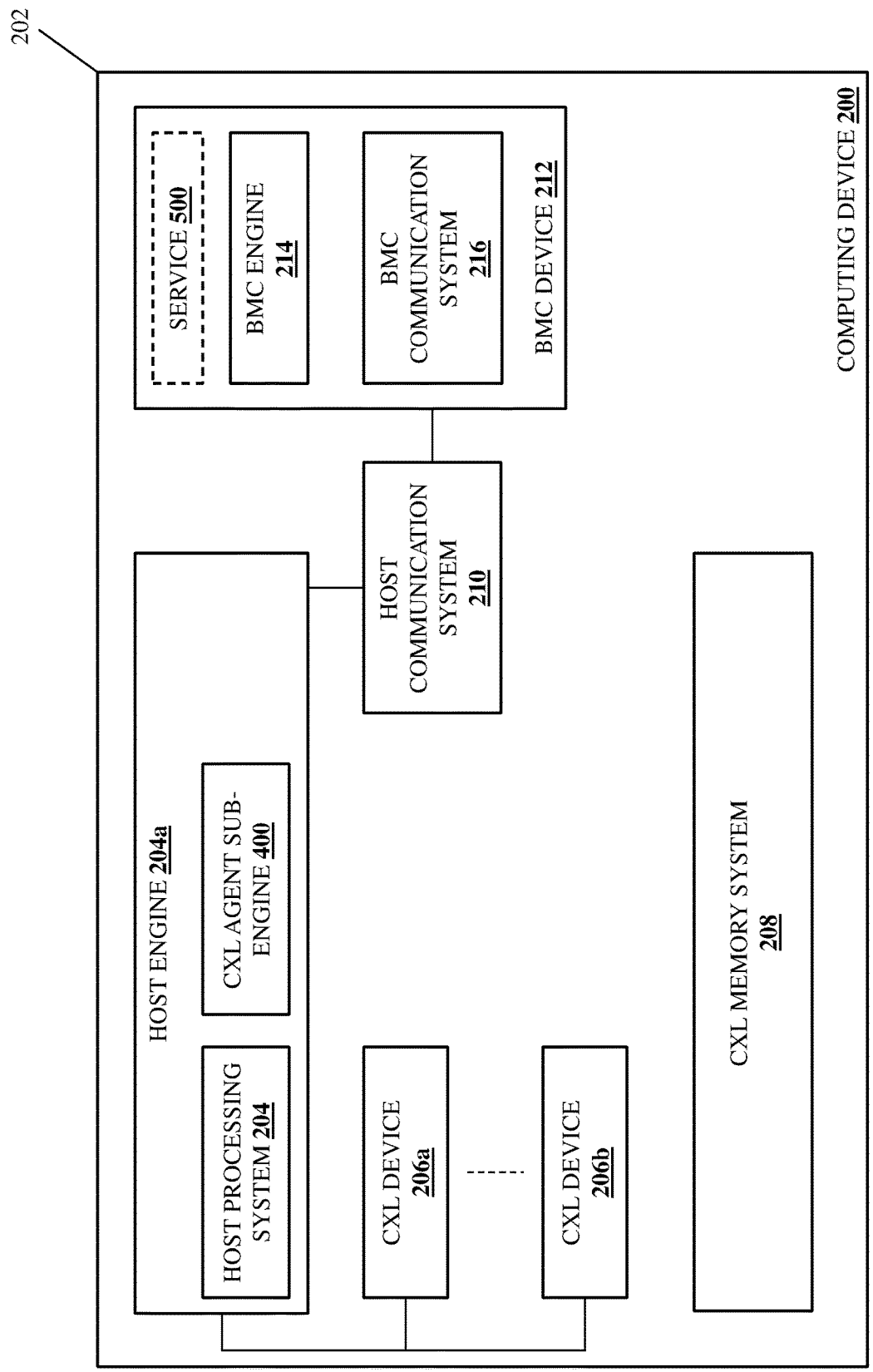
FIG. 5 is a schematic view illustrating an embodiment of the computing device of FIG. 2 operating during the method of FIG. 3.

If, at decision block 304, it is determined that BMC service(s) require external memory, the method 300 proceeds to block 306 where a BMC device provides a service memory request to the memory service agent. With reference to FIG. 5, in an embodiment of decision block 304, a service 500 may be started, "launched", and or otherwise provided and, in response, the BMMS provided by the BMC engine 214 may determine that service requires memory that is external to the BMC memory system in the BMC device 212. For example, as will be appreciated by one of skill in the art in possession of the present disclosure, service(s) such as host-dependent services, services enabled via applications provided using the SDKs discussed above, and/or other services that would be apparent to one of skill in the art in possession of the present disclosure, may require memory that is external to the BMC memory system in the BMC device 212.

To provide a specific example, the BMC engine 214 may allocate the BMC memory system in the BMC device 212 for providing the host-independent services described above, services associated with data that will be relatively more frequently accessed, and/or other services that would be apparent to one of skill in the art in possession of the present disclosure, and at some point that BMC memory system may be insufficient to provide (or adequately provide) additional services. As such, at some point during service provisioning operations, the BMC engine 214 may determine that a service that has started, "launched", and or otherwise has been (or will be) provided, requires memory external to the BMC memory system in order to be (or adequately be) provided.

In some embodiments, the BMC engine 214 may be configured to provide services associated with data that will be relatively less frequently accessed using the memory that is external to the BMC device 212, and one of skill in the art in possession of the present disclosure will appreciate how the provisioning of services associated with data that will be relatively more frequently accessed using the BMC memory system, while provisioning services associated with data that will be relatively less frequently accessed using memory external to the BMC memory system, provides for more efficient performance (e.g., read/write performance) in service provisioning due to the quicker access times associated with data stored in the BMC memory system by the BMC engine 214.

Figure 6:
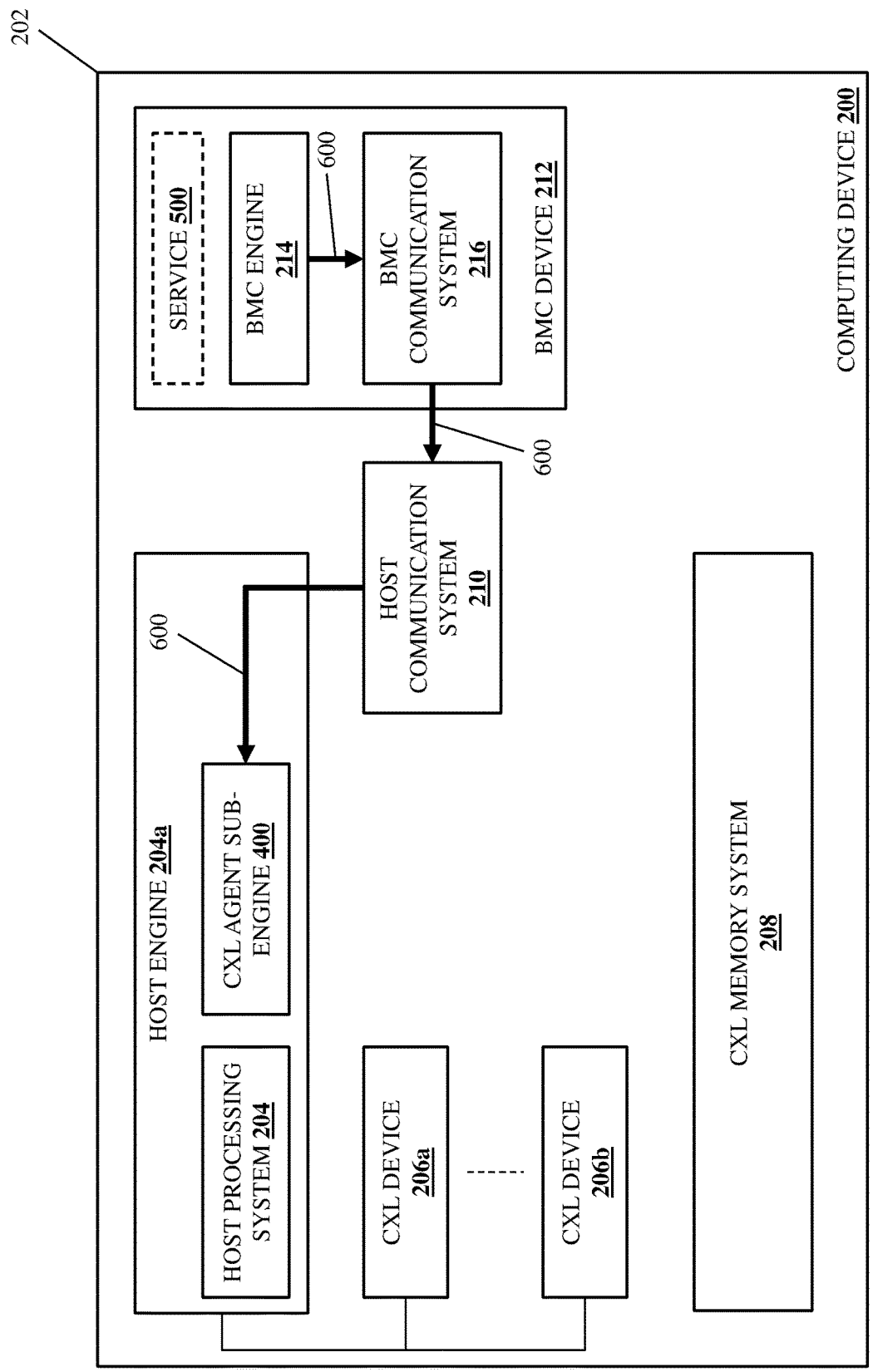
FIG. 6 is a schematic view illustrating an embodiment of the computing device of FIG. 2 operating during the method of FIG. 3.

With reference to FIG. 6, in an embodiment of block 306 and in response to determining that the service 500 will require memory external to the BMC memory system in the BMC device 212 at decision block 304, the BMC engine 214 may perform service memory request operations 600 that may include generating a service memory request, and transmitting that service memory request via the BMC communication system 216 and the host communication system 210 such that the CXL agent sub-engine 400 in the host engine 204a receives that service memory request.

For example, at block 306, the BMMS provided by the BMC engine 214 may determine an amount of memory that will be required to provide the service 500, and then may generate an MMBI request that provides the service memory request and that identifies the amount of memory that will be required to provide the service 500, and that may include any other external memory request information that one of skill in the art in possession of the present disclosure would recognize as enabling the functionality described below. In some embodiments, the amount of memory required to provide the service 500 may be based on a desired "feature set" or other functionality provided by the service 500. As such, in some specific examples, the BMC engine 214 may determine a desired feature set or functionality for the service 500 (which may be less than a "full" feature set or functionality of the service 500), and request an amount of memory needed to provide that desired feature set or functionality, and one of skill in the art in possession of the present disclosure will appreciate how such techniques may be performed to conserve the amount of memory requested for services provided by the BMC engine 214 (e.g., by determining an amount of memory available to the BMC engine 214 for performing services, determining a portion of that amount of memory that should be allocated for a particular service, identifying a feature set or functionality that requires no more than that portion of that amount of memory, and requesting that portion of that amount of memory).

The BMMS provided by the BMC engine 214 may then generate an interrupt via the MMBI provided by the BMC communication system 216 and the host communication system 210, and use the MMBI to transmit the MMBI request to the CXL agent sub-engine 400. However, while a specific example of the provisioning of a service memory request has been described, one of skill in the art in possession of the present disclosure will appreciate how external memory may be requested for providing a BMC service using other techniques that will fall within the scope of the present disclosure as well.

Figure 7:
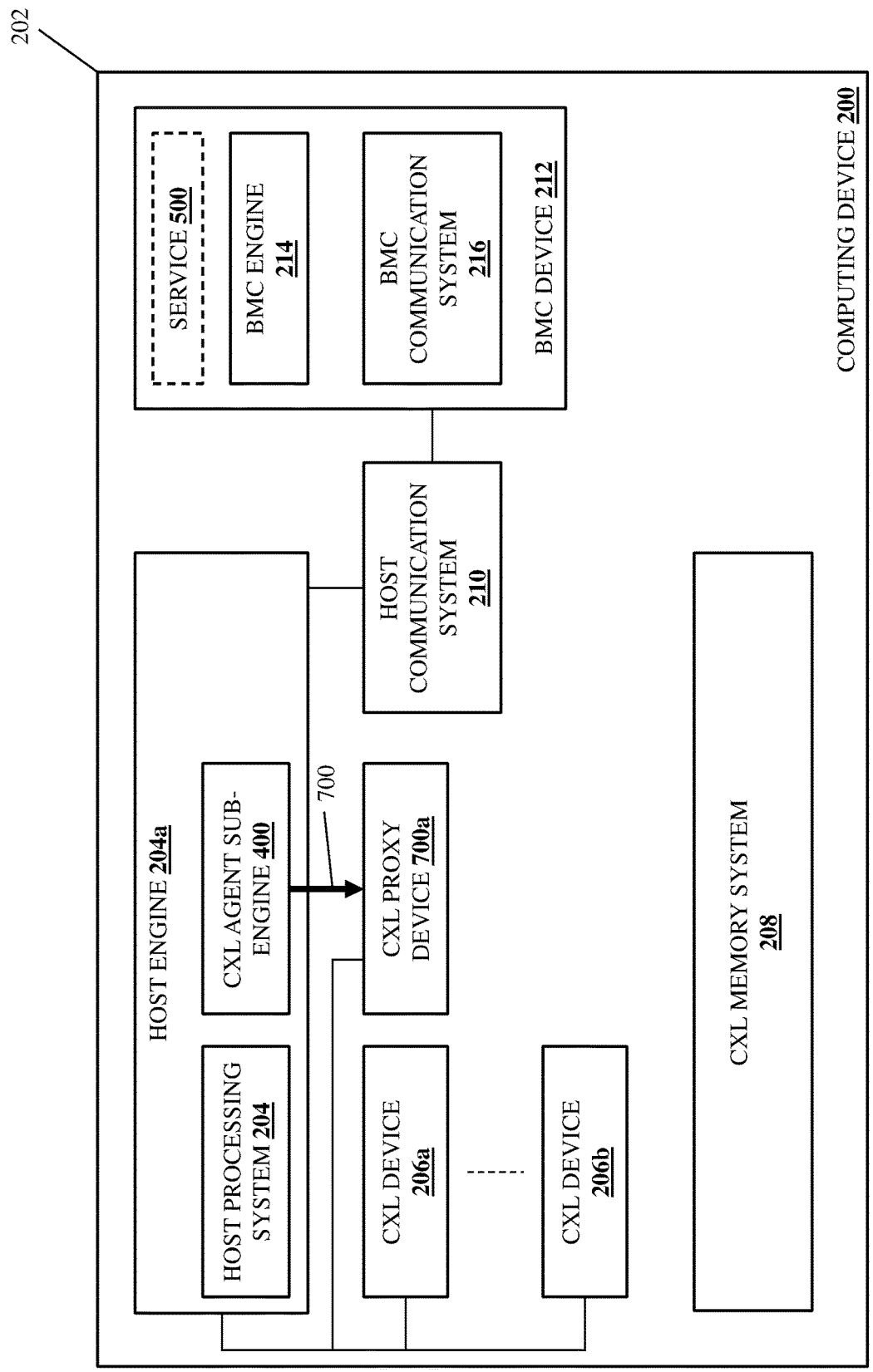
FIG. 7 is a schematic view illustrating an embodiment of the computing device of FIG. 2 operating during the method of FIG. 3.
Figure 8:
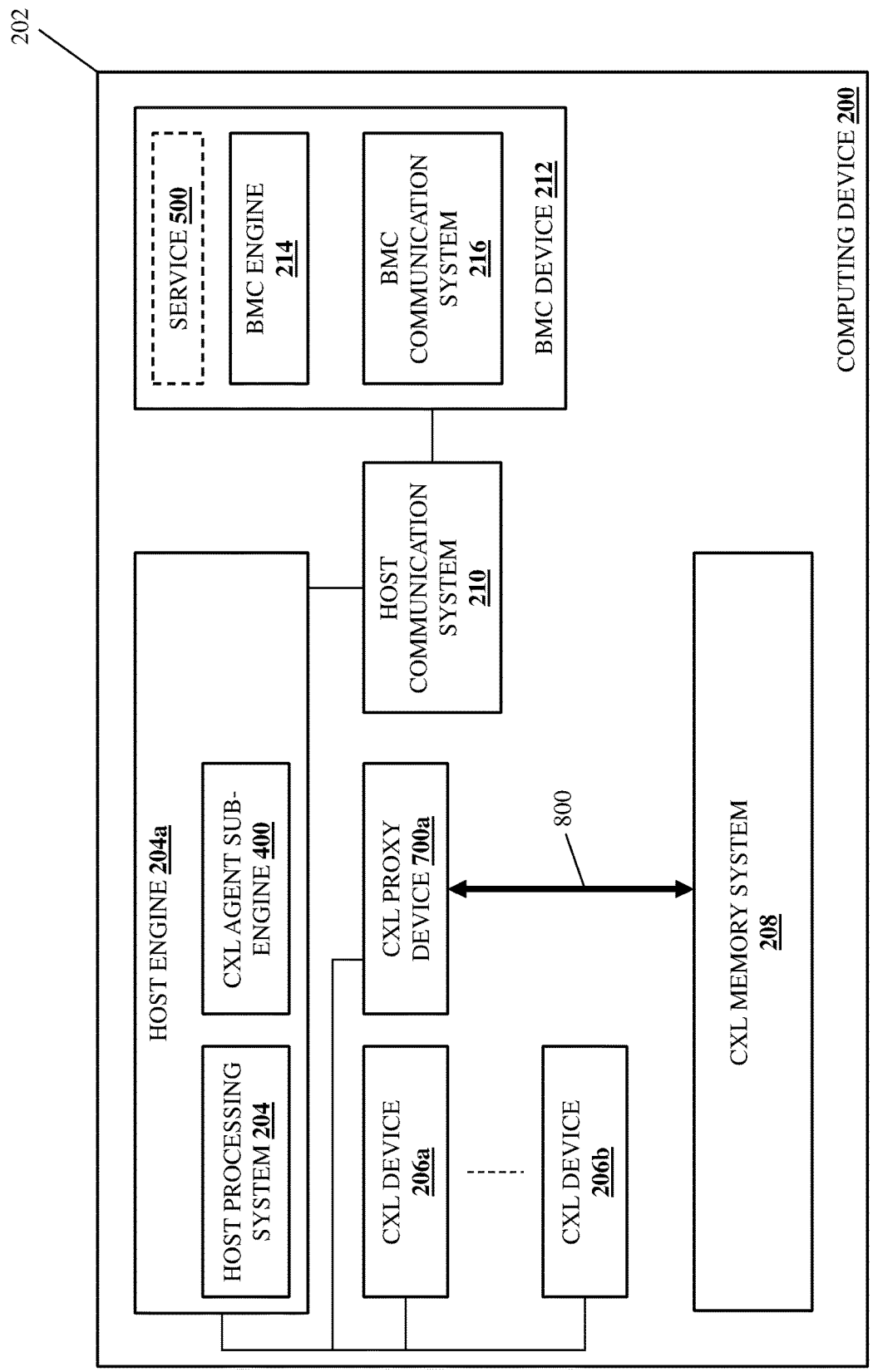
FIG. 8 is a schematic view illustrating an embodiment of the computing device of FIG. 2 operating during the method of FIG. 3.

The method 300 then proceeds to block 308 where the memory agent subsystem instructs a computing device component to operate as a memory proxy and reserve a BMC reserved memory subsystem. With reference to FIG. 7, in an embodiment of block 308 and in response to receiving the service memory request at block 306, the CXL agent sub-engine 400 in the host engine 204a may perform memory proxy instruction operations 700 that include identifying a CXL device that is configured to use the CXL memory system 208, determining that CXL device is available to operate as a CXL proxy device (e.g., the CXL proxy device 700a illustrated in FIG. 7), transmitting a memory proxy instruction that instructs that CXL device to operate as a memory proxy and reserve a BMC reserved memory subsystem in the CXL memory system that is sufficient to provide the amount of memory that was identified in the service memory request as being required to provide the service 500, and/or any other operations that one of skill in the art in possession of the present disclosure would recognize as enabling the memory proxy operations described below.

As will be appreciated by one of skill in the art in possession of the present disclosure, the CXL proxy device 700a may be provided by any of the CXL devices 206a-206b. Furthermore, in some embodiments the CXL proxy device 700a may be provided by one of the CXL devices 206a-206b that was not previously using the CXL memory system 208. However, in other embodiments the CXL proxy device 700a may be provided by one of the CXL devices 206a-206b that was previously (and is currently) using the CXL memory system 208, and that has capacity to operate as a memory proxy to enable the BMC engine 214 to provide the service 500 using the BMC reserved memory subsystem in the CXL memory system 208 via the CXL proxy device 700a. Furthermore, in some embodiments, the CXL devices 206a-206b may be configured to reserve and "set aside" memory subsystems and/or memory capacity from the CXL memory system 208 for use in providing the BMC reserved memory subsystem, and thus the "reserving" of memory subsystems by the CXL proxy device 700a may be performed (at least partially) prior to operating as the CXL proxy device 700a, with the memory proxy instruction from the CXL agent sub-engine 400 causing any of the CXL devices 206a-206b to operate as the CXL proxy device 700a to allocate that "set-aside" memory subsystem for use by the BMC engine 214 as the BMC reserved memory subsystem.

In response to being instructed to operate as the memory proxy and reserve a BMC reserved memory subsystem in the CXL memory system 208, the CXL proxy device 700a may perform BMC reserved memory subsystem reservation operations 800 that include requesting the BMC reserved memory subsystem (e.g., the amount of memory required to provide the service 500 as identified in the memory proxy instruction) from the CXL memory system 208, receiving an indication that the BMC reserved memory subsystem has been reserved in the CXL memory system 208, and/or any other CXL memory subsystem reservation operations that one of skill in the art in possession of the present disclosure would recognize as reserving a portion of a CXL memory system for use in providing a service.

Figure 9:
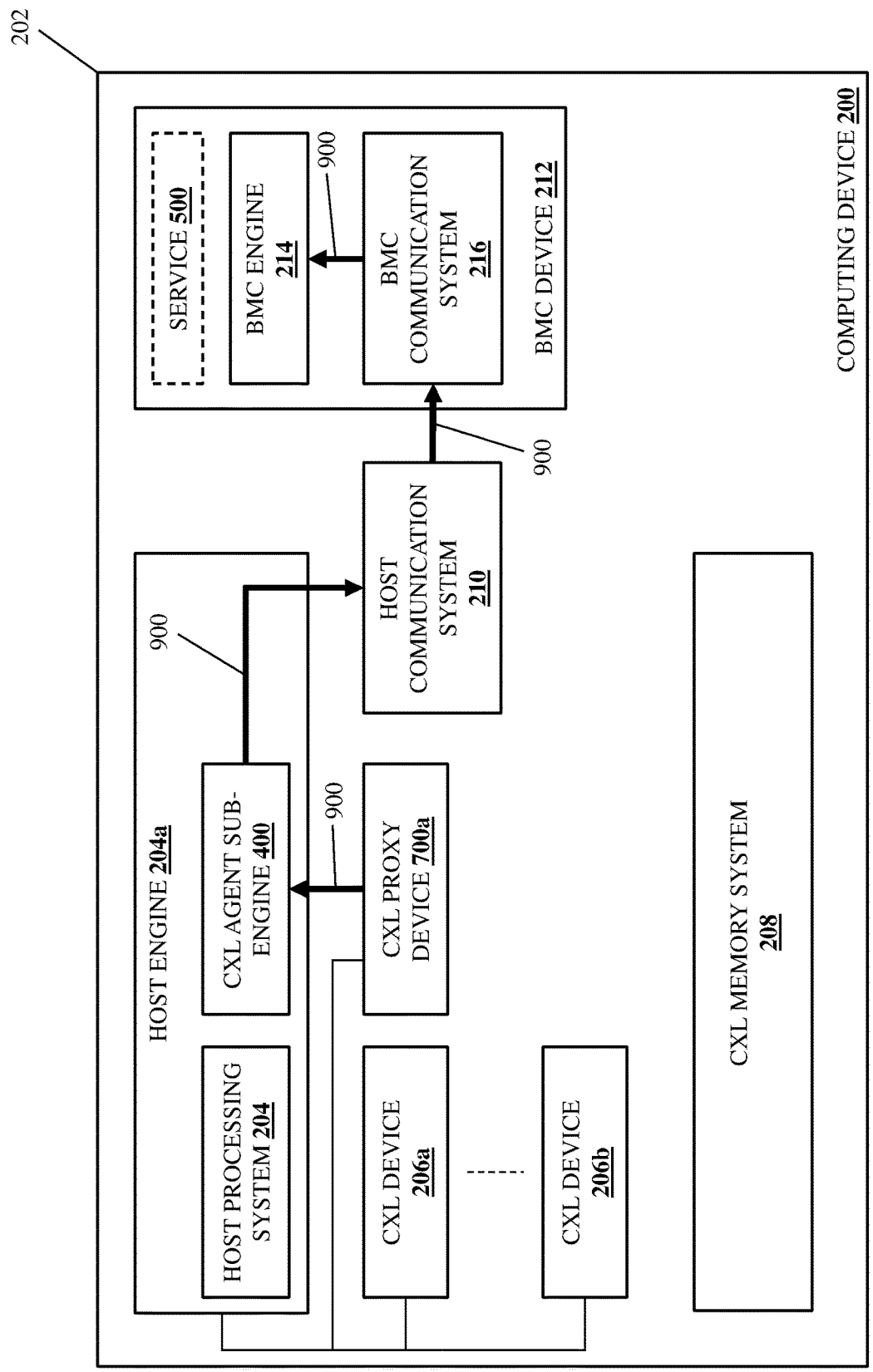
FIG. 9 is a schematic view illustrating an embodiment of the computing device of FIG. 2 operating during the method of FIG. 3.

With reference to FIG. 9, in response to reserving the BMC reserved memory subsystem, the CXL proxy device 700a may perform BMC reserved memory subsystem information provisioning operations 900 that may include transmitting, via the CXL agent sub-engine 400, the host communication system 210 and the BMC communication system 216, BMC reserved memory subsystem information to the BMC engine 214. For example, the CXL agent sub-engine 400 may communicate with the CXL agent sub-engine 400 to utilize the MMBI provided by the host communication system 210 and the BMC communication system 216 to transmit memory address(es) for the BMC reserved memory subsystem, as well as provide any other CXL memory information that one of skill in the art in possession of the present disclosure would recognize as enabling the CXL memory system usage described below, to the BMMS provided by the BMC engine 214. In response to receiving the BMC memory subsystem information, the BMMS provided by the BMC engine 214 may map the BMC reserved memory subsystem to virtual memory that will be used by the service 500 in, for example, a BMC database included in the BMC device 212. However, while a specific example of the reserving of a portion of a memory system for use in providing a service has been described, one of skill in the art in possession of the present disclosure will appreciate how memory may be reserved for use in providing a service in a variety of manners that will fall within the scope of the present disclosure as well.

Figure 10:
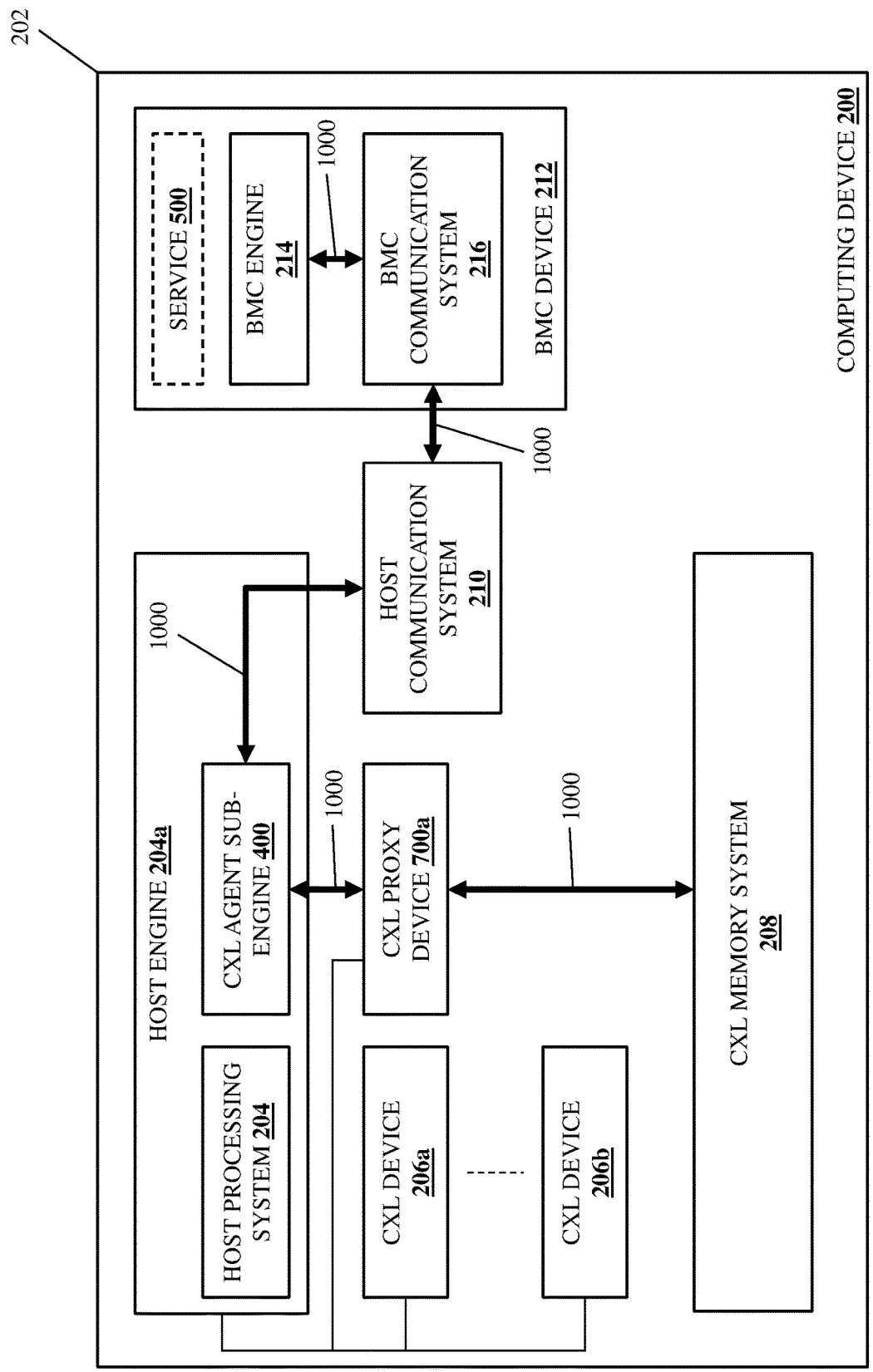
FIG. 10 is a schematic view illustrating an embodiment of the computing device of FIG. 2 operating during the method of FIG. 3.

The method 300 then proceeds to block 310 where the memory agent subsystem transmits data via the computing device component and between the BMC device and the BMC reserved memory subsystem to allow the BMC device to provide the BMC service(s). With reference to FIG. 10, in an embodiment of block 310, the BMC engine 214, the CXL agent sub-engine 400 in the host engine 204a, and the CXL proxy device 700a may perform service provisioning operations 1000 that may include the BMC engine 214 providing the service 500 using the BMC reserved memory subsystem provided by the CXL memory system 208 via the CXL agent sub-engine 400 and using the CXL proxy device 700a as a "passthrough". For example, the service 500 may be provided by an application that utilizes virtual memory that the BMMS provided by the BMC engine 214 has mapped to the BMC reserved memory subsystem as described above, and thus memory usage instructions (e.g., the transmission of data, the retrieval of data, etc.) generated via the provisioning of the service 500 and directed to that virtual memory may be translated to the corresponding BMC reserved memory subsystem by the BMMS provided by the BMC engine 214 via that mapping, and those translated memory usage instructions may then be used to generate Memory Mapped Input/Output (MMIO) communications that are transmitted via the MMBI provided by the BMC communication system 216 and the host communication system 210 to the CXL agent sub-engine 400.

In response to receiving the MMIO communications, the CXL agent sub-engine 400 in the host engine 204a may forward those MMIO communications via the CXL proxy device 700a operating as a passthrough, and to the BMC reserved memory subsystem in the CXL memory system 208. As such, one of skill in the art in possession of the present disclosure will appreciate how the MMIO communications described above may include "write" MMIO communications including data that may be stored in the BMC reserved memory subsystem in the CXL memory system 208 upon the receipt of those write MMIO communications as described above. However, one of skill in the art in possession of the present disclosure will also appreciate how the MMIO communications described above may include "read" MMIO communications that include a request for data that is stored in the BMC reserved memory subsystem in the CXL memory system 208, and upon the receipt of those read MMIO communications as described above, that data may be retrieved from the BMC reserved memory subsystem in the CXL memory system 208 and provided to the BMC engine 214 (e.g., via the CXL proxy device 700a, the CXL agent sub-engine 400, the host communication system 210, and the BMC communication system 216 similarly as described above) for use in providing the service 500.

As such, the CXL proxy device 700a may be used to provide the service 500 by reserving and providing access to a memory subsystem in the CXL memory system 208 that it has reserved for the service 500, and one of skill in the art in possession of the present disclosure will appreciate how the CXL proxy device 700*a* may perform similar operations for other services provided by the BMC engine 214 in the BMC device 212 in a manner similar to that described above. However, while a single CXL proxy device 700*a* is described as enabling the use of the CXL memory system 208 for a plurality of services provided by the BMC engine 214 in the BMC device 212, one of skill in the art in possession of the present disclosure will appreciate how a single, respective CXL proxy device may be provided to enable the use of the CXL memory system 208 for each of a plurality of services provided by the BMC engine 214 in the BMC device 212 while remaining within the scope of the present disclosure as well.

As will be appreciated by one of skill in the art in possession of the present disclosure, once the provisioning of the service 500 is completed, the BMC engine 214 may inform the CXL agent sub-engine 400 in the host engine 204*a* and, in response to being informed that the service 500 is no longer being provided the CXL agents sub-engine 400 may instruct the CXL proxy device 700*a* to "un-reserve" or otherwise return the BMC reserved memory subsystem to the CXL memory system 208 so that it may be used by other CXL devices if needed, and may then cease operating as a memory proxy (e.g., in the event the CXL proxy device 700*a* is not operating as a memory proxy for any other services provided by the BMC engine 214). As such, the BMC engine 214 may dynamically expand and reduce its use of the CXL memory system 208 as services are performed and completed.

Furthermore, as discussed above, the BMC engine 214 may be configured to provide services associated with data that will be relatively more frequently accessed using the BMC memory system, while providing services associated with data that will be relatively less frequently accessed using memory external to the BMC memory system, in order to provide for more efficient performance (e.g., read/write performance) in service provisioning due to the quicker access times associated with data stored in the BMC memory system by the BMC engine 214, and one of skill in the art in possession of the present disclosure will appreciate how the BMC engine 214 may "swap" the BMC reserved memory subsystem in the CXL memory system 208 that is being used to provide any particular service with a portion of the BMC memory system in the event, for example, that portion of the BMC memory system becomes available and that service is associated with the most frequently accessed data of the services that are being provided using the CXL memory system 208. As such, any particular service provided by the BMC engine 214 may be "moved" from being provided using the CXL memory system 208 external to the BMC device 212 to be provided using the BMC memory system in the BMC device 212 in order to provide for more efficient performance (e.g., read/write performance) in providing a plurality of services via the BMC device 212.

Thus, systems and methods have been described that provide for the use of an external memory system in a computing device by its BMC device. For example, the BMC memory expansion system of the present disclosure may include a computing device having a BMC device that provides services for the computing device, a memory subsystem, a computing device component coupled to the memory subsystem, and a memory agent subsystem coupled to the BMC device and the computing device component. The memory agent subsystem receives a service memory request from the BMC device and, in response, instructs the computing device component to operate as a memory proxy and reserve the memory subsystem for use by the BMC device to provide a BMC reserved memory subsystem. The memory agent subsystem then transmits data from the BMC device and via the computing device component to the BMC reserved memory subsystem, and from the BMC reserved memory subsystem and via the computing device component to the BMC device, to allow the BMC device to provide at least one of the services for the computing device. As such, BMC devices may dynamically expand their memory resources as needed in order to provide services(s) for their computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC) memory expansion system, comprising:
   a computing device;
   a Baseboard Management Controller (BMC) device that is included in the computing device and that includes at least one BMC processor that is configured to provide a plurality of services on the BMC device for the computing device;
   a memory subsystem that is included in the computing device;
   a computing device hardware component that is coupled to the memory subsystem; and
   a memory agent subsystem that is coupled to the BMC device and the computing device hardware component, wherein the memory agent subsystem is provided by at least one memory agent processor that is configured to:
      receive, from the BMC device, a service memory request for at least one of the plurality of services provided by the at least one BMC processor on the BMC device for the computing device;
      instruct, based on the service memory request, the computing device hardware component to operate as a memory proxy and reserve the memory subsystem to provide a BMC reserved memory subsystem for use by the at least one BMC processor to provide the at least one of the plurality of services on the BMC device for the computing device; and
      transmit, via the computing device hardware component, data from the at least one BMC processor to the BMC reserved memory subsystem and from the BMC reserved memory subsystem to the at least one BMC processor to allow the at least one BMC processor to provide the at least one of the plurality of services on the BMC device for the computing device using the BMC reserved memory subsystem.

2. The system of claim 1, wherein the BMC reserved memory subsystem is included in a Compute eXpress Link (CXL) memory system.

3. The system of claim 1, wherein the at least one of the plurality of services for the computing device include a management service that is provided by at least one BMC processor on the BMC device and that is configured to manage at least one hardware resource in the computing device.

4. The system of claim 1, wherein the data transmitted from the at least one BMC processor to the BMC reserved memory subsystem and from the BMC reserved memory subsystem to the at least one BMC processor is provided in Memory-Mapped Input/Output (MMIO) communications.

5. The system of claim 1, wherein the memory agent subsystem is provided by an operating system that is provided by the at least one memory agent processor during runtime operations by the computing device.

6. The system of claim 1, wherein the memory agent subsystem is provided by a Basic Input/Output System (BIOS) that is provided by the at least one memory agent processor during initialization operations for the computing device.

7. The system of claim 1, wherein the BMC device includes a BMC hardware memory subsystem and the at least one BMC processor is configured to provide at least one of the plurality of services on the BMC device for the computing device using the BMC hardware memory subsystem.

8. An Information Handling System (IHS), comprising:
a memory agent processing system that includes at least one memory agent processor; and
a memory agent memory system that is coupled to the memory agent processing system and that includes instructions that, when executed by the at least one memory agent processor in the memory agent processing system, cause the at least one memory agent processor in the processing system to provide a memory agent engine that is configured to:
receive, from a Baseboard Management Controller (BMC) device that includes at least one BMC processor that is coupled to the memory agent processing system and that is configured to provide a plurality of services on the BMC device for the IHS, a service memory request for at least one of the plurality of services that are provided by the at least one BMC processor on the BMC device for the IHS;
instruct, based on the service memory request, a computing device hardware component that is coupled to the memory agent processing system to operate as a memory proxy and reserve a memory subsystem to provide a BMC reserved memory subsystem for use by the at least one BMC processor to provide the at least one of the plurality of services on the BMC device for the IHS; and
transmit, via the computing device hardware component, data from the at least one BMC processor to the BMC reserved memory subsystem and from the BMC reserved memory subsystem to the at least one BMC processor to allow the at least one BMC processor to provide the at least one of the plurality of services on the BMC device for the IHS using the BMC reserved memory subsystem.

9. The IHS of claim 8, wherein the BMC reserved memory subsystem is included in a Compute eXpress Link (CXL) memory system.

10. The IHS of claim 8, wherein the at least one of the plurality of services for the IHS includes a management service that is provided by at least one BMC processor on the BMC device and that is configured to manage at least one hardware resource in the IHS.

11. The IHS of claim 8, wherein the data transmitted from the at least one BMC processor to the BMC reserved memory subsystem and from the BMC reserved memory subsystem to the at least one BMC processor is provided in Memory-Mapped Input/Output (MMIO) communications.

12. The IHS of claim 8, wherein the memory agent engine is provided by an operating system that is provided by the at least one memory agent processor during runtime operations by the IHS.

13. The IHS of claim 8, wherein the memory agent engine is provided by a Basic Input/Output System (BIOS) that is provided by the at least one memory agent processor during initialization operations for the IHS.

14. A method for expanding memory available to a Baseboard Management Controller (BMC) device, comprising:
receiving, by a memory agent subsystem that is provided by at least one memory agent processor from a Baseboard Management Controller (BMC) device that includes at least one BMC processor that is configured to provide a plurality of services on the BMC device for a computing device, a service memory request;
instructing, by the at least one memory agent processor that provides the memory agent subsystem and based on the service memory request, a computing device hardware component to operate as a memory proxy and reserve a memory subsystem to provide a BMC reserved memory subsystem for use by the at least one BMC processor to provide the at least one of the plurality of services on the BMC device for the computing device; and
transmitting, by the memory agent subsystem via the computing device hardware component, data from the at least one BMC processor to the BMC reserved memory subsystem and from the BMC reserved memory subsystem to the at least one BMC processor to allow the at least one BMC processor to provide the at least one of the plurality of services on the BMC device for the computing device using the BMC reserved memory subsystem.

15. The method of claim 14, wherein the BMC reserved memory subsystem is included in a Compute eXpress Link (CXL) memory system.

16. The method of claim 14, wherein the at least one of the plurality of services for the computing device includes a management service that is provided by at least one BMC processor on the BMC device and that is configured to manage at least one hardware resource in the computing device.

17. The method of claim 14, wherein the data transmitted from the at least one BMC processor to the BMC reserved memory subsystem and from the BMC reserved memory subsystem to the at least one BMC processor is provided in Memory-Mapped Input/Output (MMIO) communications.

18. The method of claim 14, wherein the memory agent subsystem is provided by an operating system that is provided by the at least one memory agent processor during runtime operations by the computing device.

19. The method of claim 14, wherein the memory agent subsystem is provided by a Basic Input/Output System (BIOS) that is provided by the at least one memory agent processor during initialization operations for the computing device.

20. The method of claim 14, further comprising:
providing, by the at least one BMC processor using a BMC hardware memory subsystem that is included in the BMC device, at least one of the plurality of services on the BMC device for the computing device.

\* \* \* \* \*